US009553468B2

(12) United States Patent
Bhardwaj

(10) Patent No.: US 9,553,468 B2
(45) Date of Patent: *Jan. 24, 2017

(54) CHARGING TECHNIQUES FOR SOLID-STATE BATTERIES IN PORTABLE ELECTRONIC DEVICES

(71) Applicant: Apple Inc., Cupertino, CA (US)

(72) Inventor: Ramesh C. Bhardwaj, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/947,434

(22) Filed: Nov. 20, 2015

(65) Prior Publication Data

US 2016/0079777 A1 Mar. 17, 2016

Related U.S. Application Data

(63) Continuation of application No. 13/354,179, filed on Jan. 19, 2012, now Pat. No. 9,197,096.

(51) Int. Cl.
*H02J 7/00* (2006.01)
*H02J 7/14* (2006.01)
*H01M 10/44* (2006.01)
*H02J 7/04* (2006.01)

(52) U.S. Cl.
CPC ............ *H02J 7/007* (2013.01); *H01M 10/443* (2013.01); *H02J 7/0052* (2013.01); *H02J 7/0091* (2013.01); *H02J 7/047* (2013.01); *H01M 2220/30* (2013.01); *H02J 7/0031* (2013.01); *H02J 7/0081* (2013.01); *H02J 7/0093* (2013.01)

(58) Field of Classification Search
USPC ....... 320/107, 125, 134, 136, 144, 153, 154, 320/160
See application file for complete search history.

(56) References Cited

U.S. PATENT DOCUMENTS

| 5,436,548 | A | 7/1995 | Thomas |  |
|---|---|---|---|---|
| 6,111,389 | A * | 8/2000 | Aranovich | H01M 10/44 320/150 |
| 6,603,288 | B2 * | 8/2003 | Sakakibara | H02J 7/0091 320/151 |
| 8,018,203 | B2 | 9/2011 | Nishi |  |
| 8,368,357 | B2 | 2/2013 | Ghantous |  |
| 2004/0135552 | A1 | 7/2004 | Wolin |  |

(Continued)

FOREIGN PATENT DOCUMENTS

JP 2010277839 A 12/2010

*Primary Examiner* — Alexis A Boateng
(74) *Attorney, Agent, or Firm* — Blank Rome LLP

(57) ABSTRACT

The disclosed embodiments provide a system that manages use of a solid-state battery in a portable electronic device. During operation, the system monitors a temperature of the solid-state battery during use of the solid-state battery with the portable electronic device. Next, the system modifies a charging technique for the solid-state battery based on the monitored temperature to increase a capacity or a cycle life of the solid-state battery. To modify the charging technique based on the monitored temperature, the system may increase a charge rate of the solid-state battery if the temperature exceeds a first temperature threshold. On the other hand, the system may maintain the charge rate of the solid-state battery if the temperature does not exceed the first temperature threshold.

20 Claims, 6 Drawing Sheets

(56) References Cited

U.S. PATENT DOCUMENTS

| | | |
|---|---|---|
| 2004/0135553 A1 | 7/2004 | Sakakibara |
| 2005/0242777 A1 | 11/2005 | VanBeek |
| 2006/0214639 A1 | 9/2006 | Miwa |
| 2006/0220620 A1 | 10/2006 | Aradachi |
| 2008/0001577 A1* | 1/2008 | Sather ................. B60C 23/0411 320/162 |
| 2008/0212249 A1 | 9/2008 | Grewe |
| 2009/0021217 A1 | 1/2009 | Nakazawa |
| 2009/0085527 A1* | 4/2009 | Odaohhara ........... H02J 7/0091 320/150 |
| 2009/0195210 A1 | 8/2009 | Takeuchi |
| 2010/0007310 A1 | 1/2010 | Kawamoto |
| 2010/0075209 A1 | 3/2010 | Kimura |
| 2010/0277128 A1* | 11/2010 | Tam ........................ G06F 1/203 320/150 |
| 2011/0182119 A1 | 7/2011 | Strasser |
| 2012/0153877 A1* | 6/2012 | Baba .................... H02J 7/0054 318/139 |
| 2012/0166031 A1* | 6/2012 | Nishida ................ H02J 7/0026 701/22 |

* cited by examiner

CHARGING TECHNIQUES FOR SOLID-STATE BATTERIES IN PORTABLE ELECTRONIC DEVICES

CROSS REFERENCE TO RELATED APPLICATIONS

This Non-provisional application is a continuation of U.S. Non-Provisional application, application Ser. No. 13/354,179, filed on Jan. 19, 2012 and issued as U.S. Pat. No. 9,197,096 on Nov. 24, 2015, the entire contents of which is herein incorporated by reference.

BACKGROUND

Field

The disclosed embodiments relate to batteries for portable electronic devices. More specifically, the disclosed embodiments relate to charging techniques for solid-state batteries in portable electronic devices.

Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

Recent advances in battery technology have also led to the development of solid-state batteries, in which electrodes and a thin solid electrolyte are layered on top of a non-conducting substrate. Because the solid electrolyte takes up less space and/or weighs less than the liquid electrolyte of a comparable lithium-ion and/or lithium-polymer battery, the solid-state battery may have a higher energy density than the lithium-ion and/or lithium-polymer battery. In addition, the solid-state battery may be safer and/or more reliable than conventional lithium-ion and/or lithium-polymer batteries. For example, the use of a non-flammable, solid electrolyte in the solid-state battery may allow the solid-state battery to sidestep liquid electrolyte hazards such as spilling, boiling, gassing, and/or fires. Consequently, solid-state batteries may improve the safety, reliability, form factor, and/or runtime of portable electronic devices.

SUMMARY

The disclosed embodiments provide a system that manages use of a solid-state battery in a portable electronic device. During operation, the system monitors a temperature of the solid-state battery during use of the solid-state battery with the portable electronic device. Next, the system modifies a charging technique for the solid-state battery based on the monitored temperature to increase a capacity or a cycle life of the solid-state battery. To modify the charging technique based on the monitored temperature, the system may increase a charge rate of the solid-state battery if the temperature exceeds a first temperature threshold (e.g., 25° Celsius). On the other hand, the system may maintain the charge rate of the solid-state battery if the temperature does not exceed the first temperature threshold.

In some embodiments, the system further increases the charge rate of the solid-state battery if the temperature exceeds a second temperature threshold (e.g., 45° Celsius) that is higher than the first temperature threshold.

In some embodiments, increasing the charge rate of the solid-state battery involves at least one of increasing a charge current of the solid-state battery, and increasing a charge voltage of the solid-state battery.

In some embodiments, the portable electronic device is at least one of a mobile phone, a laptop computer, a tablet computer, and a portable media player.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
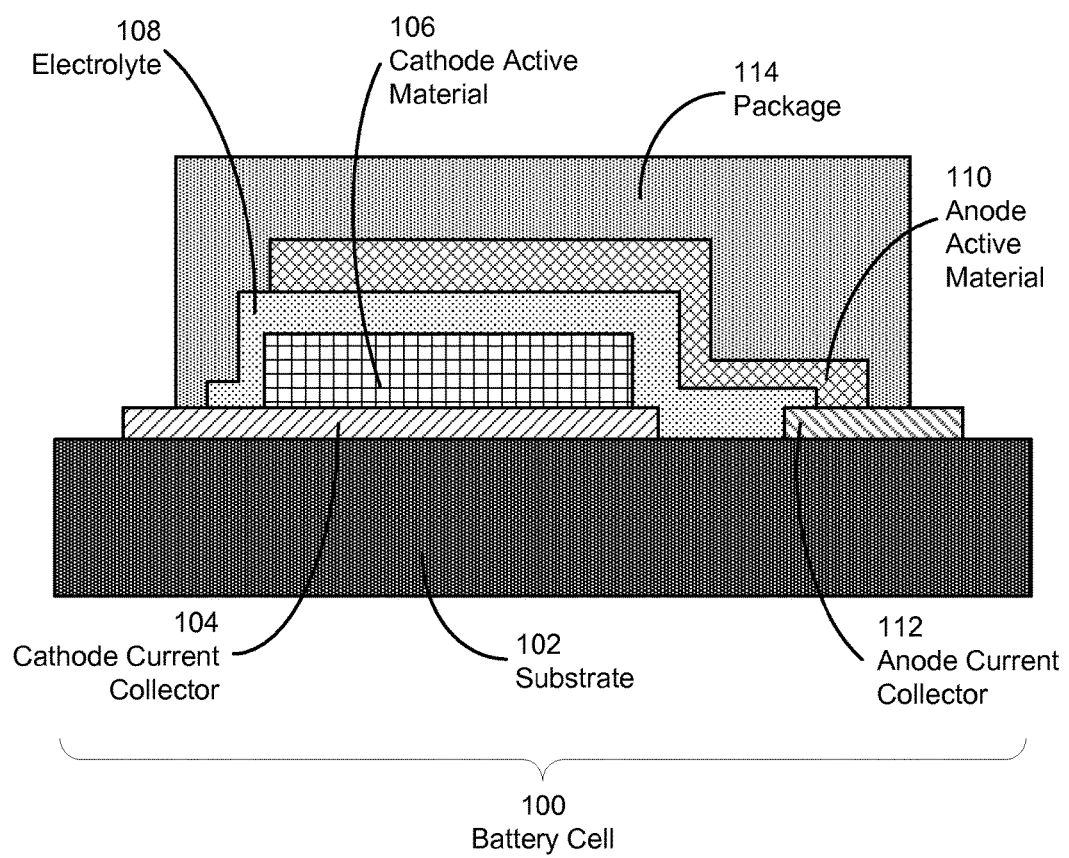
FIG. 1 shows a cross-sectional view of a battery cell in accordance with the disclosed embodiments.

FIG. 1 shows a cross-sectional view of a battery cell 100 in accordance with the disclosed embodiments. As shown in FIG. 1, battery cell 100 includes a substrate 102, a cathode current collector 104, a cathode active material 106, an electrolyte 108, an anode active material 110, and an anode current collector 112.

More specifically, FIG. 1 shows a cross-sectional view of a solid-state battery cell 100. The components of battery cell 100 may be formed by depositing layers of different materials onto substrate 102 and/or one another. For example, substrate 102 may correspond to a non-conducting substrate such as mica, polyamide, and/or polyether ether ketone (PEEK). A vacuum deposition technique may be used to deposit cathode current collector 104 as a layer of platinum and/or gold onto substrate 102 and anode current collector 112 as a layer of copper onto substrate 102. Next, a sputtering technique may be used to deposit a lithium compound corresponding to cathode active material 106 onto cathode current collector 104, along with a thin film of lithium phosphorus oxynitride (LiPON) corresponding to a solid electrolyte 108 over cathode current collector 104, cathode active material 106, substrate 102, and/or anode current collector 112. A layer of lithium may then be thermally evaporated onto the LiPON to form anode active material 110. Finally, battery cell 100 may be sealed in a protective package 114 such as a polymer frame and/or flexible pouch.

Figure 2:
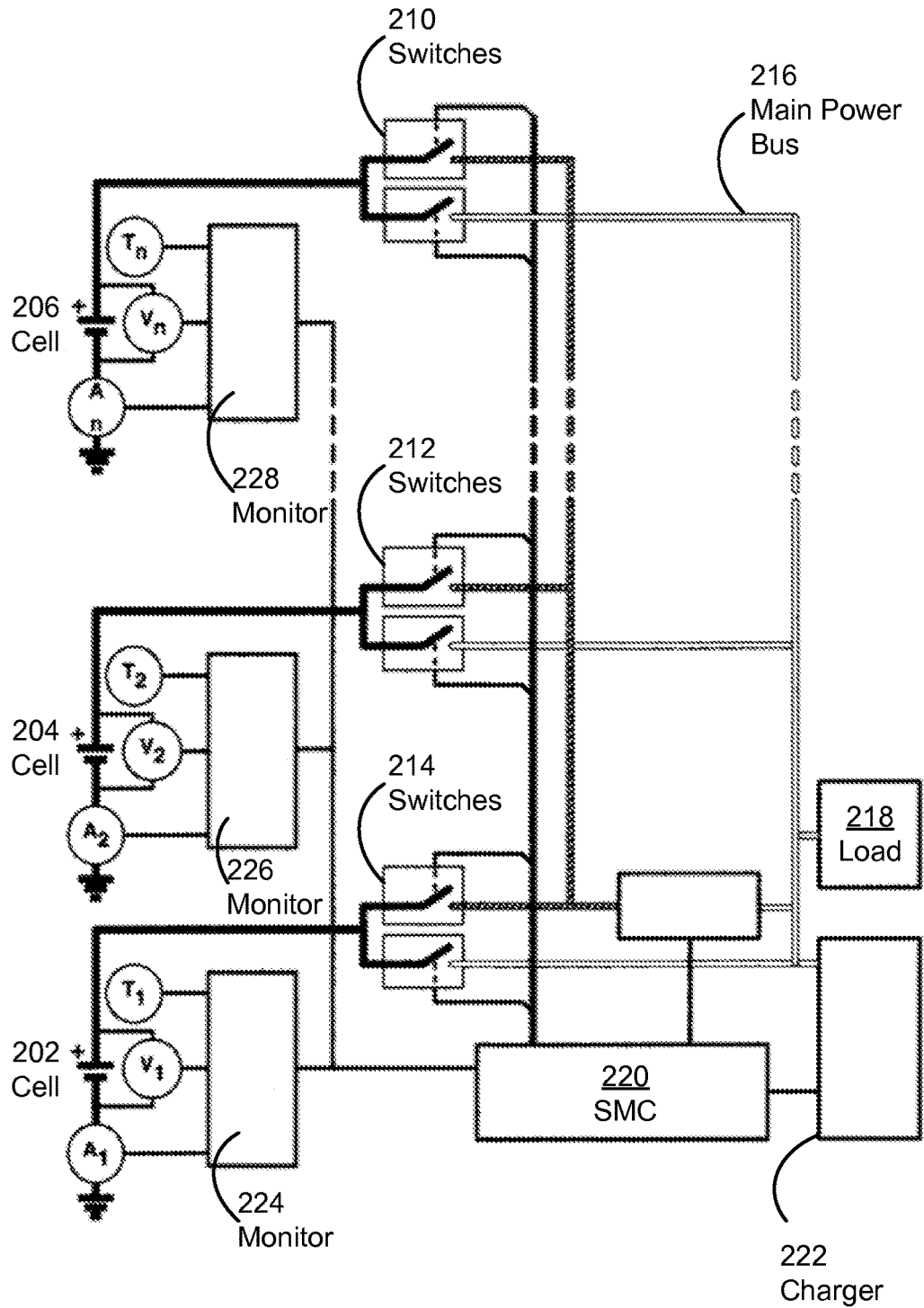
FIG. 2 shows a schematic of a system in accordance with the disclosed embodiments.

FIG. 2 shows a schematic of a system in accordance with an embodiment. The system may provide a power source to a portable electronic device, such as a mobile phone, personal digital assistant (PDA), laptop computer, tablet computer, portable media player, and/or peripheral device. In other words, the system may correspond to a battery that supplies power to a load 218 from one or more components (e.g., processors, peripheral devices, backlights, etc.) within the portable electronic device. For example, the battery may correspond to a solid-state battery that includes one or more cells 202-206, such as battery cell 100 of FIG. 1. As shown in FIG. 2, the system also includes a set of switches 210-214, a main power bus 216, a system microcontroller (SMC) 220, a charger 222, and a set of monitors 224-228.

In one or more embodiments, cells 202-206 are connected in a series and/or parallel configuration with one another using main power bus 216. Each cell 202-206 may include a sense resistor (not shown) that measures the cell's current. Furthermore, the voltage and temperature of each cell 202-206 may be measured with a thermistor (not shown), which may further allow a battery "gas gauge" mechanism to determine the cell's state-of-charge, impedance, capacity, charging voltage, and/or remaining charge. Measurements of voltage, current, temperature, and/or other parameters associated with each cell 202-206 may be collected by a corresponding monitor 224-228. Alternatively, one monitoring apparatus may be used to collect sensor data from multiple cells 202-206 in the battery.

Data collected by monitors 224-228 may then be used by SMC 220 to assess the state-of-charge, capacity, and/or health of cells 202-206. Monitors 224-228 and SMC 220 may be implemented by one or more components (e.g., processors, circuits, etc.) of the portable electronic device.

In particular, SMC 220 may correspond to a management apparatus that uses the data to manage use of the battery in the portable electronic device. For example, SMC 220 may correspond to a management apparatus that uses the state-of-charge of each cell 202-206 to adjust the charging and/or discharging of the cell by connecting or disconnecting the cell to main power bus 216 and charger 222 using a set of switches 210-214. Fully discharged cells may be disconnected from main power bus 216 during discharging of the battery to enable cells with additional charge to continue to supply power to load 218.

Along the same lines, fully charged cells may be disconnected from main power bus 216 during charging of the battery to allow other cells to continue charging.

Those skilled in the art will appreciate that reductions in battery capacity may result from factors such as age, use, defects, heat, and/or damage. In particular, charging and discharging of a conventional lithium-ion or lithium-polymer battery may cause a reaction of electrolyte with cathode and anode material. The reaction may both decrease the capacity of the battery and cause swelling through enlargement of the electrode and/or gas buildup inside the battery. Moreover, the reaction may be accelerated if the battery is operated at higher temperatures and/or continuously charged at high charge voltages. For example, a lithium-polymer battery that is operated at 25° Celsius and/or charged at 4.2V may reach 80% of initial capacity and increase in thickness by 8% after 1050 charge-discharge cycles. However, use of the same battery at 45° Celsius and/or a charge voltage of 4.3V may decrease the capacity to 70% of initial capacity and increase the swelling to 10% after 1050 charge-discharge cycles.

On the other hand, the electrolyte conductivity of a solid-state battery may increase with temperature. In turn, the solid-state battery may experience better performance and/or a longer cycle life at higher operating temperatures. For example, a solid-state battery may have a capacity of 1500 mAh and a cycle life of 1000 charge-discharge cycles if the solid-state battery is operated at 25° Celsius and a capacity of 1600 mAh and a cycle life of 1200 charge-discharge cycles if the solid-state battery is operated at 45° Celsius.

In one or more embodiments, the system of FIG. 2 includes functionality to facilitate use of a solid-state battery with the portable electronic device. During use of the solid-state battery with the portable electronic device, monitors 224-228 and/or SMC 220 may monitor the temperature of the solid-state battery. SMC 220 may then modify a charging technique for the solid-state battery based on the monitored temperature to increase the capacity and/or cycle life of the solid-state battery.

More specifically, SMC 220 may modify the charging technique by increasing the charge rate of the solid-state battery every time the battery's temperature exceeds a temperature threshold. To increase the charge rate, SMC 220 may increase the charge current and/or charge current of the solid-state battery. Conversely, SMC 220 may maintain the charge rate of the solid-state battery if the battery's temperature does not exceed a temperature threshold. Solid-state battery charge rates and charge times as a function of temperature are discussed in further detail below with respect to FIGS. 3-4.

For example, SMC 220 may set temperature thresholds of 25° Celsius, 45° Celsius, 60° Celsius, and 70° Celsius for the solid-state battery and begin charging the solid-state battery at an initial charge rate of 0.5° C. Each time the battery's temperature exceeds one of the temperature thresholds (e.g., due to heat buildup from charging the battery and/or use of the portable electronic device), SMC 220 may increase the charge rate by 0.5° C. On the other hand, if the battery's temperature remains relatively constant during charging, SMC 220 may maintain the charge rate until the battery is fully charged. Finally, if the battery's temperature drops below a temperature threshold, the battery's charge rate may be reduced by 0.5° C.

By charging the solid-state battery faster at higher temperatures, SMC 220 may facilitate efficient charging of the battery. In addition, SMC 220 may perform such charging without adversely impacting the cycle life and/or capacity of the battery, thus maximizing use of the battery with the portable electronic device. In other words, SMC 220 may facilitate use of the portable electronic device by optimizing the use of the solid-state battery with the portable electronic device.

Figure 3:
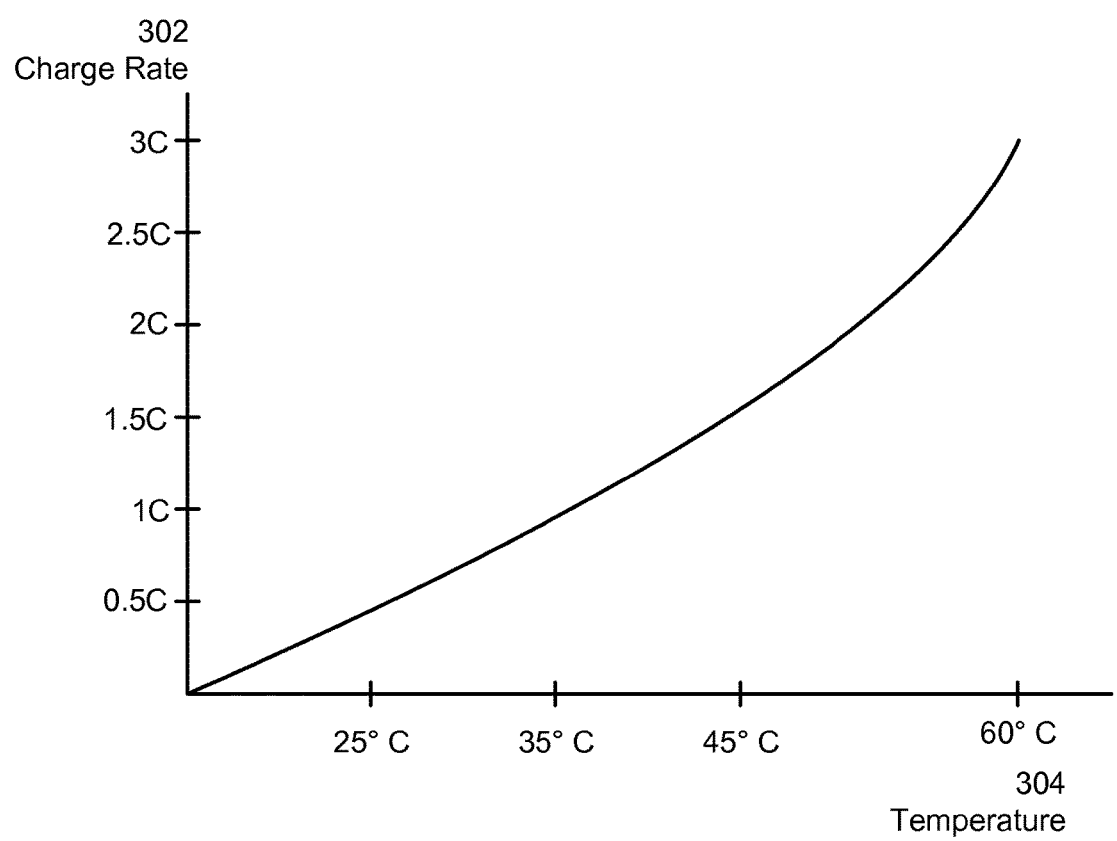
FIG. 3 shows an exemplary plot in accordance with the disclosed embodiments.

FIG. 3 shows an exemplary plot in accordance with the disclosed embodiments. More specifically, FIG. 3 shows a plot of a charge rate 302 for a solid-state battery as a function of the battery's temperature 304. As shown in FIG. 3, charge rate 302 may increase with temperature 304 to accommodate the solid-state battery's increased electrolyte conductivity at higher temperatures. For example, charge rate 302 may be set to 0.5° C. at 25° Celsius, 1° C. at 35° Celsius, 1.5° C. at 45° Celsius, and 3° C. at 60° Celsius.

In addition, charge rate 302 may be varied based on a set of temperatures thresholds for the solid-state battery. For example, charge rate 302 may be increased each time temperature 304 exceeds a temperature threshold of 25° Celsius, 35° Celsius, 45° Celsius, or 60° Celsius. Alternatively, charge rate 302 may be modified in a more fine-grained manner (e.g., whenever temperature 304 changes by 1° Celsius) to better reflect the curve in the plot.

Figure 4:
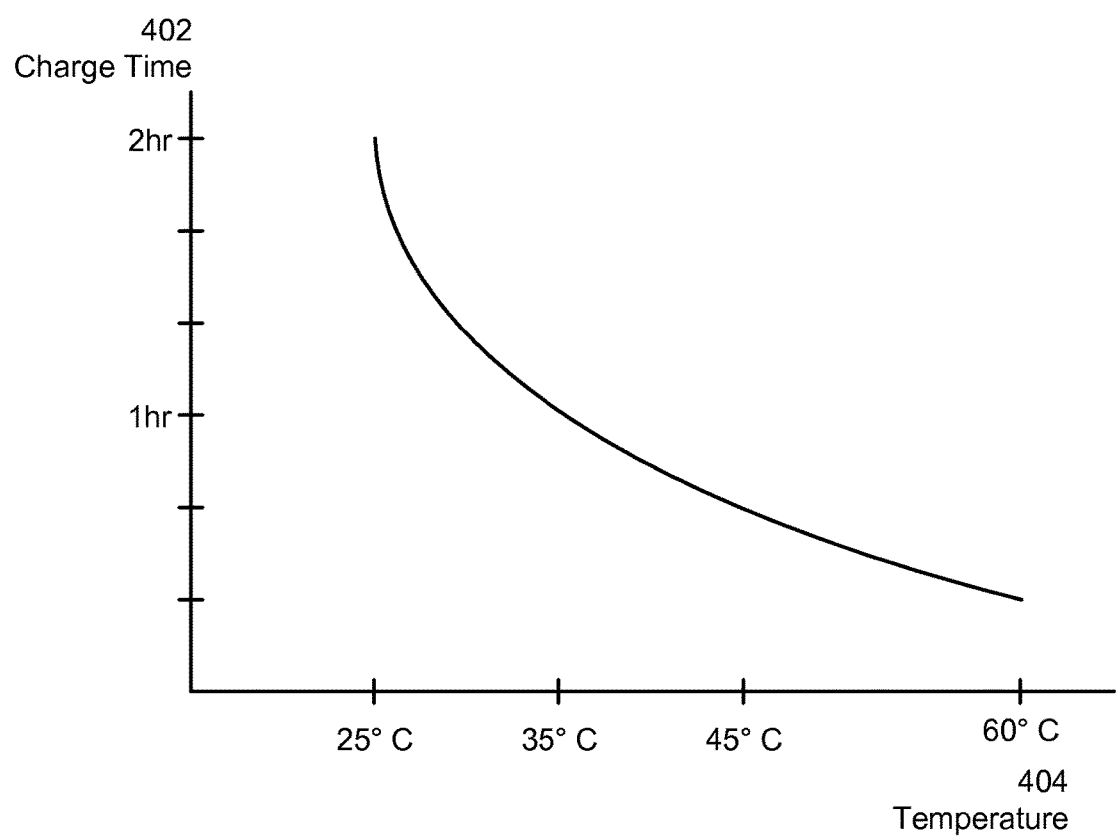
FIG. 4 shows an exemplary plot in accordance with the disclosed embodiments.

FIG. 4 shows an exemplary plot in accordance with the disclosed embodiments. In particular, FIG. 4 shows a plot of a charge time 402 for a solid-state battery as a function of temperature 404. As shown in FIG. 4, charge time 402 may decrease with temperature 404 to reflect the increase in the solid-state battery's charge rate with temperature shown in FIG. 3. For example, charge time 402 may be two hours at 25° Celsius (e.g., at a 0.5° C. charge rate), one hour at 35° Celsius (e.g., at a 1° C. charge rate), ⅔ of an hour at 45° Celsius (e.g., at a 1.5° C. charge rate), and ⅓ of an hour at 60° Celsius (e.g., at a 3° C. charge rate). As a result, the solid-state battery may perform differently from conventional batteries (e.g., lithium-ion batteries, lithium-polymer batteries) by charging faster at higher temperatures without experiencing degradation.

Figure 5:
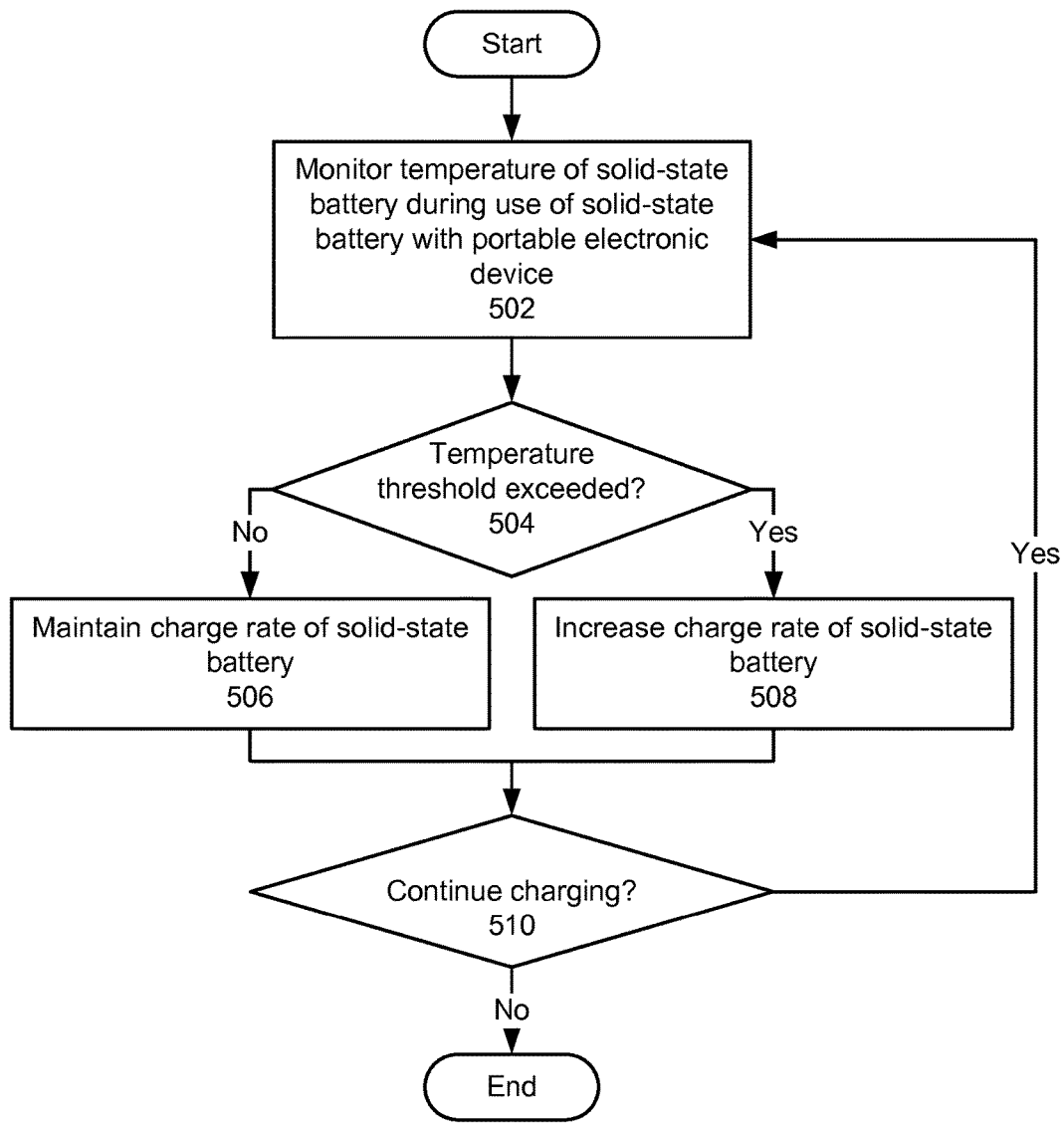
FIG. 5 shows a flowchart illustrating the process of managing use of a solid-state battery in a portable electronic device in accordance with the disclosed embodiments.

FIG. 5 shows a flowchart illustrating the process of managing use of a solid-state battery in a portable electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the temperature of a solid-state battery is monitored during use of the solid-state battery with the portable electronic device (operation 502). Next, the monitored temperature may be used to modify a charging technique for the solid-state battery. In particular, the temperature may be compared to a temperature threshold (operation 504) to determine if the temperature exceeds the temperature threshold. For example, the temperature may exceed a first temperature threshold after charging of the battery is initiated and a second temperature threshold that is higher than the first temperature threshold after use of the portable electronic device is increased (e.g., by a processor-intensive application). If the temperature does not exceed a temperature threshold, the charge rate of the solid-state battery is maintained (operation 506).

If the temperature exceeds the temperature threshold, the charge rate of the solid-state battery is increased (operation 508) to facilitate efficient charging and use of the battery. For example, the charge rate may be increased by increasing the charge current and/or charge voltage of the solid-state battery. The increased charge rate may utilize the increased electrolyte conductivity of the solid-state battery at higher temperatures, thus increasing the capacity and/or cycle life of the solid-state battery while reducing the charge time of the solid-state battery. In addition, the increase in charge rate may further increase the temperature of the solid-state battery, thus enabling subsequent increases in both the charge rate and temperature and further facilitating efficient charging of the solid-state battery.

The solid-state battery may continue to be charged (operation 510). If charging of the solid-state battery is to continue, the temperature of the solid-state battery is monitored (operation 502), and a charging technique for the solid-state battery is modified based on the monitored temperature to increase the capacity and/or cycle life of the solid-state battery (operations 504-508). For example, the solid-state battery's charge rate may be increased every time the solid-state battery's temperature exceeds a new temperature threshold. On the other hand, the solid-state battery's charge rate may be maintained if the solid-state battery's temperature plateaus and/or remains relatively constant. Such charging of the solid-state battery may continue until the solid-state battery is fully charged.

Figure 6:
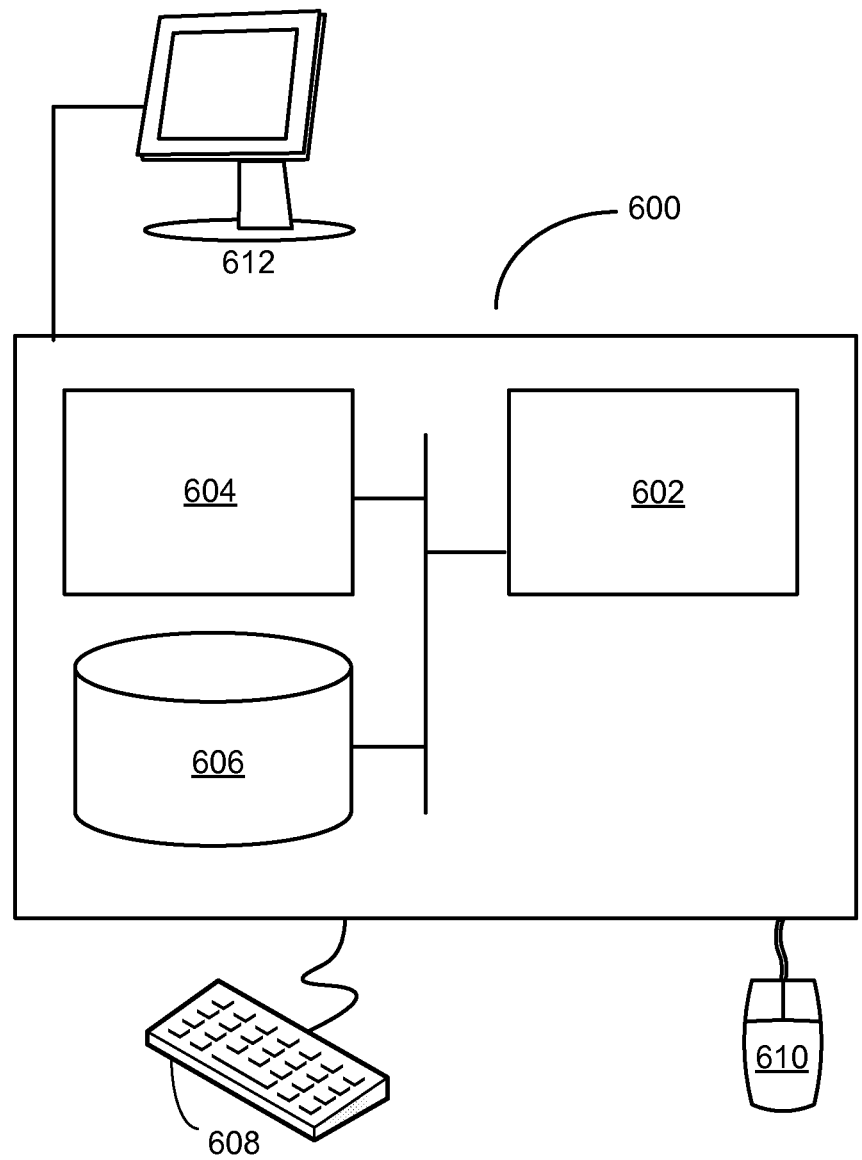
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for managing use of a solid-state battery in a portable electronic device. The system may include a monitoring apparatus that monitors a temperature of the solid-state battery during use of the solid-state battery with the portable electronic device. The system may also include a management apparatus that modifies a charging technique for the solid-state battery based on the monitored temperature to increase the capacity and/or cycle life of the solid-state battery. For example, the management apparatus may increase the charge rate of the solid-state battery whenever the temperature exceeds a temperature threshold or maintain the charge rate if the temperature does not exceed the temperature threshold. The increase in charge rate may decrease the charge time of the solid-state battery without adversely affecting the cycle life or capacity of the solid-state battery.

In addition, one or more components of computer system 600 may be remotely located and connected to the other components over a network. Portions of the present embodiments (e.g., monitoring apparatus, management apparatus, etc.) may also be located on different nodes of a distributed system that implements the embodiments. For example, the present embodiments may be implemented using a cloud computing system that monitors and manages solid-state batteries in remote portable electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for managing charging of a solid-state battery in a portable electronic device, comprising:
   monitoring a temperature of a solid-state battery during charging of the solid-state battery; and
   modifying a charge rate by increasing at least one of a charge current of the solid-state battery and a charge voltage of the solid-state battery when the monitored temperature exceeds a first temperature threshold, wherein the first temperature threshold is in a range of 45 degrees Celsius and above.

2. The computer-implemented method of claim 1, further comprising modifying the charge rate when the monitored temperature exceeds a second temperature threshold, wherein the second temperature threshold is higher than the first temperature threshold, wherein the second temperature threshold is 60 degrees Celsius and above.

3. The computer-implemented method of claim 2, further comprising increasing the charge rate by 1.5 C when the monitored temperature exceeds the first temperature threshold and does not exceed the second temperature threshold.

4. The computer-implemented method of claim 2, further comprising modifying the charge rate by 3 C when the monitored temperature exceeds the second temperature threshold.

5. The computer-implemented method of claim 1, further comprising decreasing the charge rate by 0.5 C when the monitored temperature drops below the first temperature threshold.

6. A system for managing use of a solid-state battery in a portable electronic device, comprising:
   a monitoring apparatus configured to monitor a temperature of a solid-state battery during charging of the solid-state battery; and
   a management apparatus configured to modify a charge rate by increasing at least one of a charge current of the solid-state battery and a charge voltage of the solid-state battery when the monitored temperature exceeds a first temperature threshold, wherein the first temperature threshold is in a range of 45 degrees Celsius and above.

7. The system of claim 6, wherein the management apparatus is configured to modify the charge rate when the monitored temperature exceeds a second temperature threshold, wherein the second temperature threshold is higher than the first temperature threshold, wherein the second temperature threshold is 60 degrees Celsius.

8. The system of claim 7, wherein the management apparatus is configured to increase the charge rate by 1.5 C when the monitored temperature exceeds the first temperature threshold and does not exceed the second temperature threshold.

9. The system of claim 7, wherein the management apparatus is configured to modify the charge rate by 3 C when the monitored temperature exceeds the second temperature threshold.

10. The system of claim 6, wherein the management apparatus is configured to decrease the charge rate by 0.5 C when the monitored temperature drops below the first temperature threshold.

11. A non-transitory computer-readable storage medium, readable by a processor and comprising instructions stored thereon to cause the processor to:
    monitor a temperature of a solid-state battery during charging of the solid-state battery; and
    modify a charge rate by increasing at least one of a charge current of the solid-state battery and a charge voltage of the solid-state battery when the monitored temperature exceeds a first temperature threshold, wherein the first temperature threshold is in a range of 45 degrees Celsius and above.

12. The non-transitory computer-readable storage medium of claim 11, wherein the instructions further comprise instructions to cause the processor to modify the charge rate when the monitored temperature exceeds a second temperature threshold, wherein the second temperature threshold is 60 degrees Celsius and above.

13. The non-transitory computer-readable storage medium of claim 12, wherein the instructions further comprise instructions to cause the processor to increase the charge rate by 1.5 C when the monitored temperature exceeds the first temperature threshold and does not exceed than the second temperature threshold.

14. The non-transitory computer-readable storage medium of claim 12, wherein the instructions further comprise instructions to cause the processor to modify the charge rate by 3 C when the monitored temperature exceeds the second temperature threshold.

15. The non-transitory computer-readable storage medium of claim 11, wherein the instructions further comprise instructions to cause the processor to decrease the charge rate by 0.5 C when the monitored temperature drops below the first temperature threshold.

16. A portable electronic device, comprising:
    a set of components powered by a solid-state battery;
    a monitoring apparatus programmed to monitor a temperature of the solid-state battery during charging of the solid-state battery; and
    a management apparatus programmed to modify a charge rate by increasing at least one of a charge current of the solid-state battery and a charge voltage of the solid-state battery when the monitored temperature exceeds a first temperature threshold, wherein the first temperature threshold is in a range of 45 degrees Celsius and above.

17. The portable electronic device of claim 16, wherein the management apparatus is configured to modify the charge rate when the monitored temperature exceeds a second temperature threshold, wherein the second temperature threshold is in a range of 60 degrees Celsius and above.

18. The portable electronic device of claim 17, wherein the management apparatus is configured to increase the charge rate by 1.5 C when the monitored temperature exceeds the first temperature threshold and does not exceed than the second temperature threshold.

19. The portable electronic device of claim 17, wherein the management apparatus is configured to modify the charge rate by 3 C when the monitored temperature exceeds the second temperature threshold.

20. The portable electronic device of claim 16, wherein the management apparatus is configured to decrease the charge rate by 0.5 C when the monitored temperature drops below the first temperature threshold.

* * * * *